United States Patent
Lentz

(10) Patent No.: US 11,718,029 B2
(45) Date of Patent: Aug. 8, 2023

(54) THREE-DIMENSIONAL PRINTER RESIN CURING SYSTEM USING RISLEY PRISMS

(71) Applicant: US Gov't as represented by Sec'y of Air Force, Wright-Patterson AFB, OH (US)

(72) Inventor: Joshua Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/567,932

(22) Filed: Jan. 4, 2022

(65) Prior Publication Data
US 2022/0212406 A1 Jul. 7, 2022

Related U.S. Application Data

(60) Provisional application No. 63/134,749, filed on Jan. 7, 2021.

(51) Int. Cl.
| | | |
|---|---|---|
| *B29C 64/268* | (2017.01) | |
| *B29C 64/135* | (2017.01) | |
| *B29C 64/393* | (2017.01) | |
| *B23K 26/34* | (2014.01) | |
| *B33Y 30/00* | (2015.01) | |
| *B33Y 50/02* | (2015.01) | |
| *B33Y 10/00* | (2015.01) | |

(52) U.S. Cl.
CPC ............ *B29C 64/268* (2017.08); *B23K 26/34* (2013.01); *B29C 64/135* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/268; B29C 64/135; B29C 64/393; B23K 26/34; B33Y 10/00; B33Y 50/02
See application file for complete search history.

(56) References Cited

U.S. PATENT DOCUMENTS

| | | | |
|---|---|---|---|
| 8,610,853 B2 | 12/2013 | Escuti | |
| 9,195,092 B2 | 11/2015 | Escuti et al. | |
| 9,684,094 B2 | 6/2017 | Jiang | |
| 9,689,087 B1 | 6/2017 | Li et al. | |
| 9,726,783 B2 | 8/2017 | Perrier-Cornet | |
| 9,733,467 B2 | 8/2017 | Kim et al. | |
| 10,331,009 B2 | 6/2019 | Dmitriev | |
| 2006/0139779 A1* | 6/2006 | Prince | G02B 7/1805 359/896 |
| 2008/0238811 A1* | 10/2008 | Winsor | H01Q 15/10 343/911 R |

(Continued)

OTHER PUBLICATIONS

A new beam steering concept: Risley gratings (found in IDS) (Year: 2009).*

(Continued)

*Primary Examiner* — Seyed Masoud Malekzadeh
*Assistant Examiner* — Farah Taufiq
(74) *Attorney, Agent, or Firm* — AFMCLO/JAZ; Timothy M. Barlow

(57) ABSTRACT

A resin curing system provided by stereolithography (SLA) three-dimensional (3D) printer includes a pair of Risley prism for optical steering of laser energy to achieve improved resolution.

4 Claims, 6 Drawing Sheets

(56) References Cited

U.S. PATENT DOCUMENTS

| | | | | |
|---|---|---|---|---|
| 2008/0278715 | A1* | 11/2008 | Swenson | G02B 19/0085 |
| | | | | 356/141.5 |
| 2014/0183345 | A1* | 7/2014 | Goodwin | G03F 7/70775 |
| | | | | 250/231.1 |
| 2016/0067820 | A1* | 3/2016 | Mironets | B29C 64/153 |
| | | | | 219/76.12 |
| 2016/0231172 | A1* | 8/2016 | Medhat | G02B 26/0841 |
| 2019/0243128 | A1* | 8/2019 | Johnson | G02B 26/108 |

OTHER PUBLICATIONS

Chulwoo Oh, Chulwoo Oh, Jihwan Kim, Jihwan Kim, John F. Muth, John F. Muth, Michael J. Escuti, Michael J. Escuti, } "A new beam steering concept: Risley gratings", Proc. SPIE 7466, Advanced Wavefront Control: Methods, Devices, and Applications VII, 74660J (Aug. 11, 2009); doi: 10.1117/12.828005; https://doi.org/10.1117/12.828005.

Rumpf, R. C., Pazos, J. J., Digaum, J. L., & Kuebler, S. M. (2015). Spatially variant periodic structures in electromagnetics. Philosophical Transactions of the Royal Society A: Mathematical.

Jennefir L. Digaum, Rashi Sharma, Daniel Batista, Javier J. Pazos, Raymond C. Rumpf, Stephen M. Kuebler, "Beam-bending in spatially variant photonic crystals at telecommunications wavelengths", Proc. SPIE 9759, Advanced Fabrication Technologies for Micro/Nano Optics and Photonics IX, 975911 (Mar. 14, 2016).

Pazos, j. (2010). Digitally manufactured spatially variant photonic crystals. Phd. University of texas at el paso.

Liu, Longju & Hurayth, Abu & Li, Jingjing & Hillier, Andrew & Lu, Meng. (2016). A strain-tunable nanoimprint lithography for linear variable photonic crystal filters. Nanotechnology. 27. 295301.

Liu, Xiaojun & Da, Yun & Xuan, Yimin. (2017). Full-spectrum light management by pseudo-disordered moth-eye structures for thin film solar cells. Optics Express. 25. A824.

Beaulieu, Michael & Hendricks, Nicholas & Watkins, James. (2014). Large-Area Printing of Optical Gratings and 3D Photonic Crystals Using Solution-Processable Nanoparticle/Polymer Composites. ACS Photonics.

Sun, Tangyou & Xu, Zhimou & Xu, Haifeng & Zhao, Wenning & Wu, Xinghui & Liu, Sisi & Ma, Zhichao & He, Jian & Liu, Shiyuan & Peng, Jing. (2013). Photonic crystal structures on nonflat surfaces fabricated by dry lift-off soft UV nanoimprint lithography. Journal of Micromechanics and Microengineering. 23.

Calafiore, Giuseppe & Fillot, Quentin & Dhuey, Scott & Sassolini, Simone & Salvadori, Filippo & Prada, Camilo & Munechika, Keiko & Peroz, Christophe & Cabrini, Stefano & Piña-Hernandez, Carlos. (2016). Printable photonic crystals with high refractive index for applications in visible light. Nanotechnology. 27.

* cited by examiner

THREE-DIMENSIONAL PRINTER RESIN CURING SYSTEM USING RISLEY PRISMS

CROSS-REFERENCE TO RELATED APPLICATIONS

This application claims the benefit of priority under 35 U.S.C. § 119(e) to U.S. Provisional Application Ser. No. 63/134,749 entitled "Three-dimensional printer resin curing system using Risley prisms", filed 7 Jan. 2021, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to additive manufacturing systems, and more particularly to stereolithography (SLA) three-dimensional (3D) printer.

2. Description of the Related Art

Stereolithography (SLA) 3D printers currently achieve ~50 μm resolution in lateral dimensions with a comparable layer thickness. Several models use a spatial light modulator (SLM) such as a liquid crystal on silicon (LCoS) or a digital micro-mirror devices (DMD) to generate a pattern in the liquid resin, hardening it with the ultra-violet (UV) light that illuminates the SLM. For a 2 k format printer, such an implementation yields a fixed 2.7"×4.7" lateral build size. Higher resolution and/or the ability to adapt to larger build sizes is of interest for a variety of applications.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
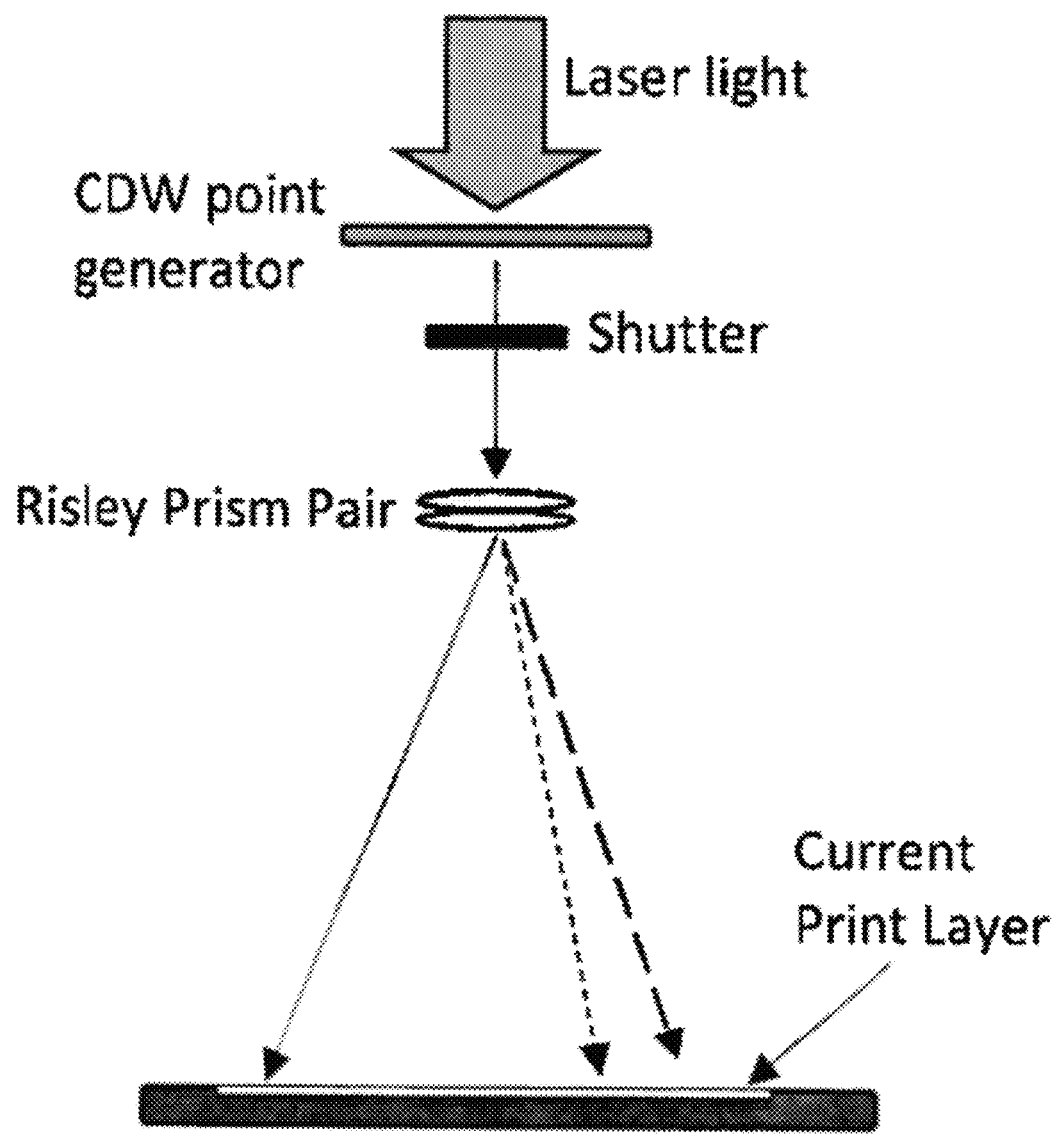
FIG. 1 illustrates a side view of an example three-dimensional printer resin curing system using a single pair of Risley prisms, according to one or more embodiments.

The present innovation provides an opto-mechanical solution for curing patterns in resin in a stereolithography (SLA) 3D printer. The invention primarily consists of a laser beam steering mechanism and laser beam conditioning for a laser and does not directly include mechanical housing. Build platform motion control (x, y, z) and light sources are discussed in alternate embodiments.

The function of Risley Prisms can be accomplished via any mechanism that results in a fixed angular offset of light. In the case of Risley Gratings [1], diffraction is used to generate the angular offset by sending all of the light into a particular nonzero diffracted order, typically in a polymerized grating form. This technique allows a very lightweight solution to Risley functions, reducing the demand on rotation stages and associated motor control as well as eliminating the chromatic aberration associated with the prism. The disadvantage of the Risley Grating is that 50% of the original source light is likely to be lost through a polarization process needed to reduce the grating to a single order output. In some cases, a circularly polarized source can be used in which case the loss would not occur. Achromatic Risley Gratings are available for custom purchase.

An additional method for the angular deviation of light is a particularly designed photonic crystal structure. In order for the photonic crystals to have the beam diverting properties necessary, they must be spatially variant photonic crystals [2-5]. These have recently been reported to be self-collimating while re-directing energy at an angle of 90 degrees [2-3]. Other, lower angular deviations are also possible using the same techniques. Designs could theoretically be extended to achromatic function.

Fabrication methods are generally specific to the photonic crystal design selected. As such, fabrication methods for this invention cannot be prescribed in general, but several methods are available in literature [4-9] and several methods have been patented [11-16].

Several variants of the present innovation are possible, each intended to accomplish the same basic process of steering UV light around the print bed. The most fundamental but not necessarily optimal form will be described here, and other variations will be included in the Alternatives section.

A single pair of Risley elements directs the incoming light to an angle away from the optical axis. By adding a second pair of Risleys some distance away from the first pair, but centered on the optical axis, the light from the first pair of Risleys can be used as compensators and direct the light to the print bed normal to the print layer.

In one or more embodiments, the present disclosure is directed to an opto-mechanical solution for curing patterns in resin in a SLA 3D printer. The invention primarily consists of a laser beam steering mechanism and laser beam conditioning for a laser and does not directly include mechanical housing. Build platform motion control (x, y, z) and light sources are discussed in alternate embodiments. The present disclosure has the capability of providing ~6 µm lateral resolution over a substantial region that depends on the desired print rates, cost and build platform motion options. Vertical resolution (layer thickness) would be accomplished with standard processes to reach layer thicknesses ~25 µm, or use a much higher cost commercial off-the-shelf (COTS) vertical lift mechanism to drive the layer thickness down to something comparable to the expected 6 µm lateral resolution.

The primary innovation in this invention is the use of Risley prisms or their equivalents to steer a laser beam around a print area. The laser (or other light source) spot is generated using a cycloidal diffractive waveplate to achieve the small spot size without the restriction of lithography lens being in close proximity to the resin layer being hardened. This long standoff distance is critical to use with the proposed Risley steering system in the printer.

Figure 2:
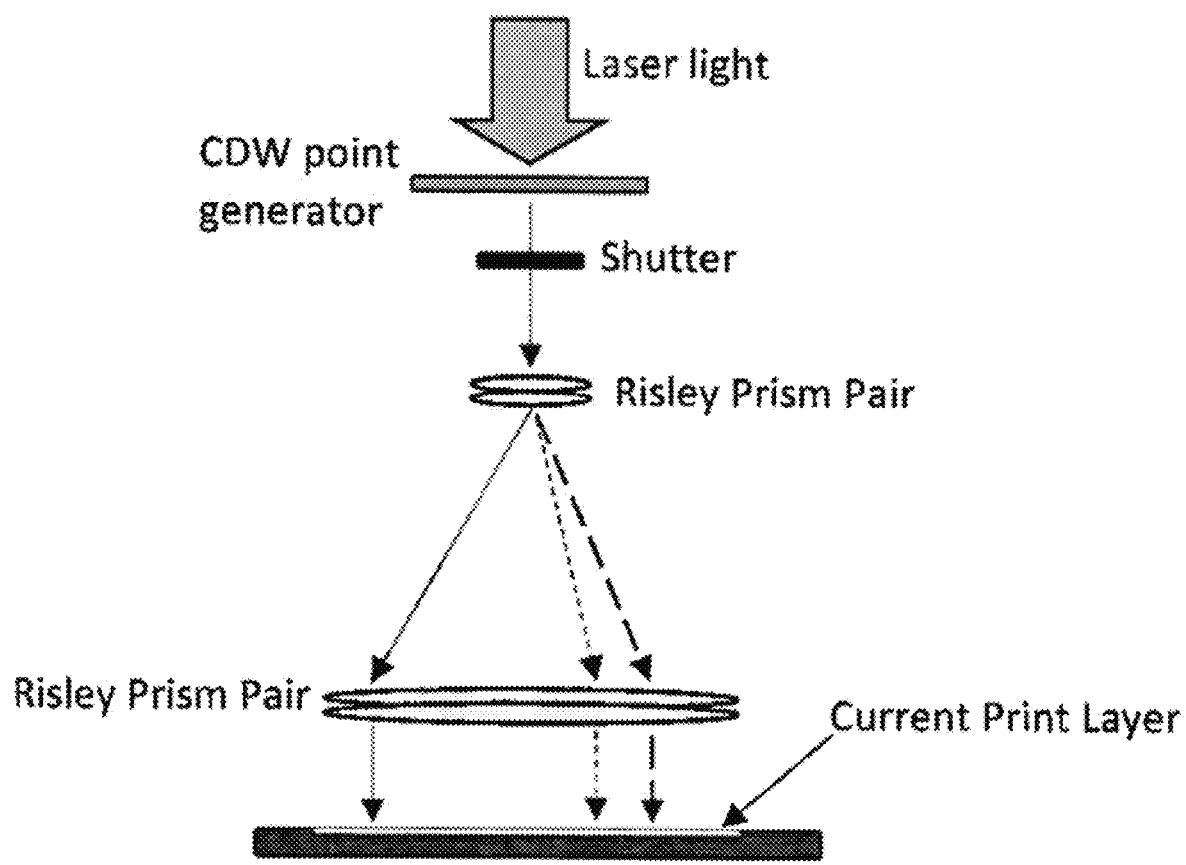
FIG. 2 illustrates a side view of an example three-dimensional printer resin curing system using first and second pairs of Risley prisms, according to one or more embodiments.
Figure 3:
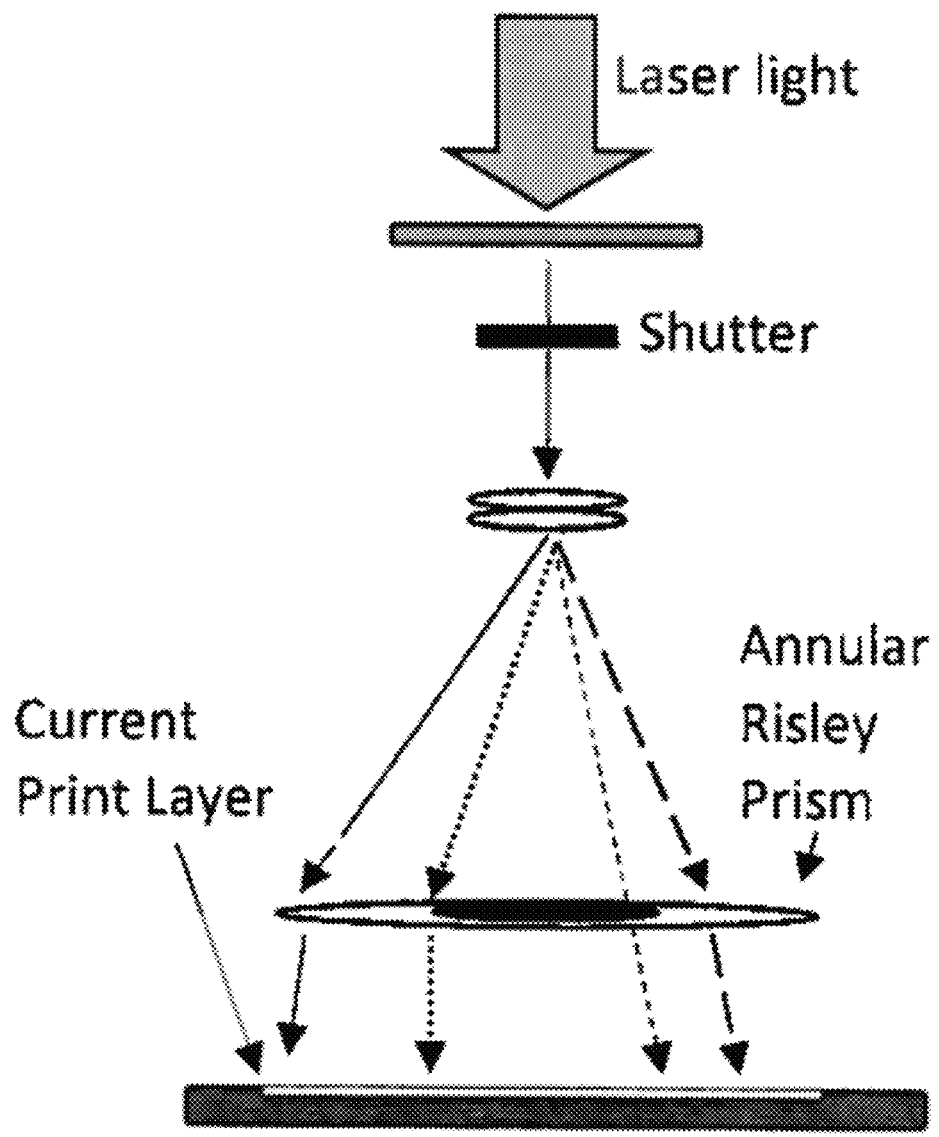
FIG. 3 illustrates a side view of an example three-dimensional printer resin curing system using a pair of Risley prisms and an annular Risley prism, according to one or more embodiments.

FIG. 1 illustrates an example three-dimensional printer resin curing system using a single pair of Risley prisms. FIG. 2 illustrates an example three-dimensional printer resin curing system using first and second pairs of Risley prisms. FIG. 3 illustrates an example three-dimensional printer resin curing system using a pair of Risley prisms and an annular Risley prism.

Figure 4A:
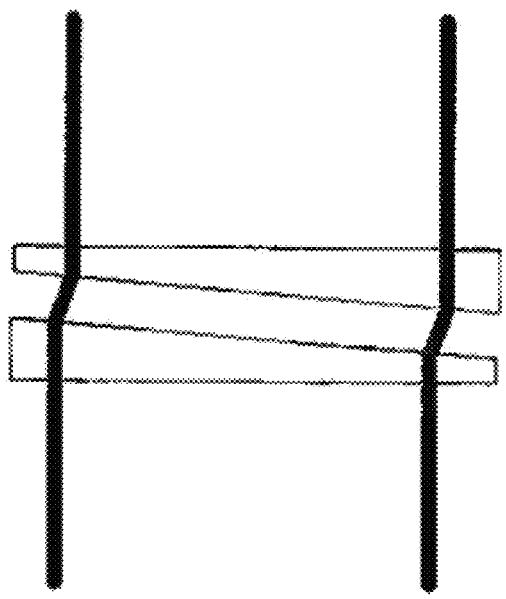
FIG. 4A illustrates a side view of a pair of Risley prisms in first rotational positions to steering with no angle, according to one or more embodiments.
Figure 4B:
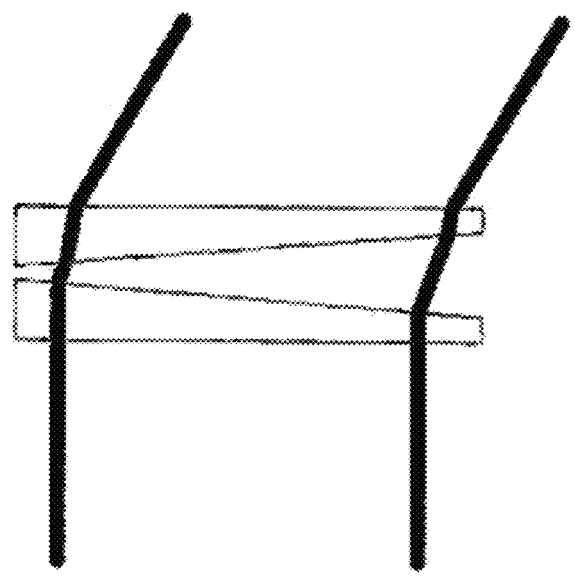
FIG. 4B illustrates a side view of the pair of Risley prisms of FIG. 4A in second rotational steering positions to steering with an induced angle, according to one or more embodiments.

Risley prisms are basic wedge prisms that have been used for decades to provide optical pointing and steering functions. FIG. 4A illustrates a pair of Risley prisms in first rotational positions to steering with no angle. FIG. 4B illustrates the pair of Risley prisms of FIG. 4A in second rotational steering positions to steering with an induced angle. Typically, the Risley prisms exist in pairs and are rotated independently of each other, allowing energy to be steered over a hemisphere of space, with the limitation in angular precision being established by the precision of rotation of the prisms. The steering function is a result of the refraction-induced angular change of light passing through the prism. The magnitude of angular change is fixed for a given prism but the direction of the output light can be adjusted by rotating the prism.

Figure 5:
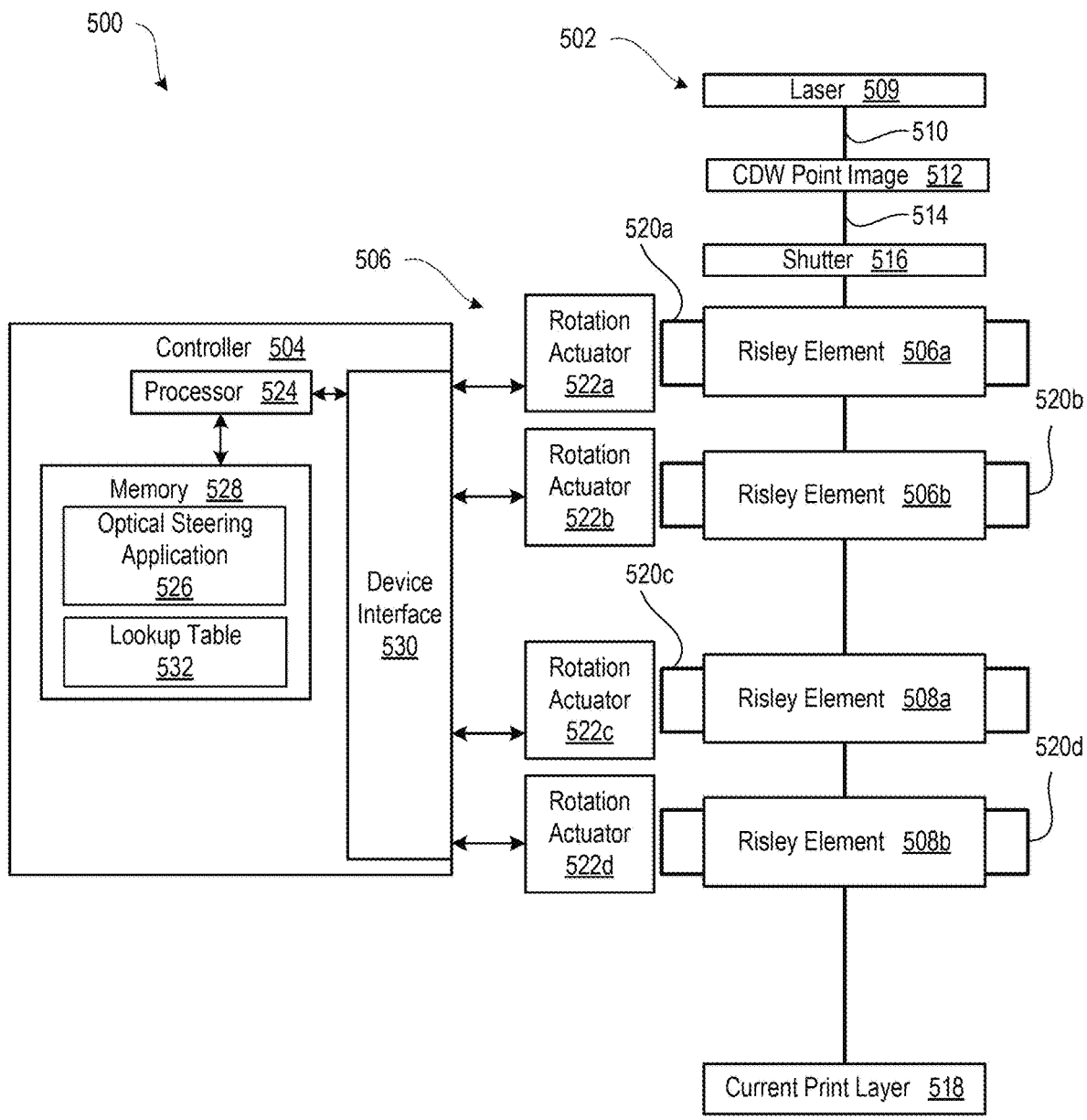
FIG. 5 illustrates a block diagram of a control system of three-dimensional printer resin curing system, according to one or more embodiments.

FIG. 5 illustrates a block diagram of a three-dimensional printer resin curing system 500 that enables a larger production size of a conventional additive manufacturing system 502. using a controller 504 controls an optical steering system 506 that can expand a size a pattern produced by a conventional additive manufacturing system 502 using one or more pairs of Risley elements 506a-506b and 508a-508b. In particular, the controller 504 rotates each Risley element 506a-506b and 508a-508b. In one or more embodiments, Risley elements 508a-508b are annular Risley elements. A laser 509 of the conventional additive manufacturing system 506 projects a laser beam 510 that is reduced in size by a polarization grating point image 512 to a reduced size laser beam 514. A shutter 516 selectively allows the reduced size laser beam 514 to pass through to the first pair of Risley element 506a-506b to increase an angular offset from a longitudinal axis of the optical steering system 506 to a current print layer 518. In one or more embodiments, the second pair of Risley elements 508a-508b can further expand or reduce the angular offset. Risley elements 506a-506b and 508a-508b. are respectively held in holders 520a-520d. The controller 502 drives rotation actuators 522a-522d to respectively and independently rotate the holders 520a-520d. In particular, the controller 502 includes a processor 524 that accesses an optical steering application 526 stored in device memory 528 to execute the rotations via a device interface 530 according to a lookup table 532 that defines rotational positions required for Risley elements 506a-506b and 508a-508b.

Figure 6:
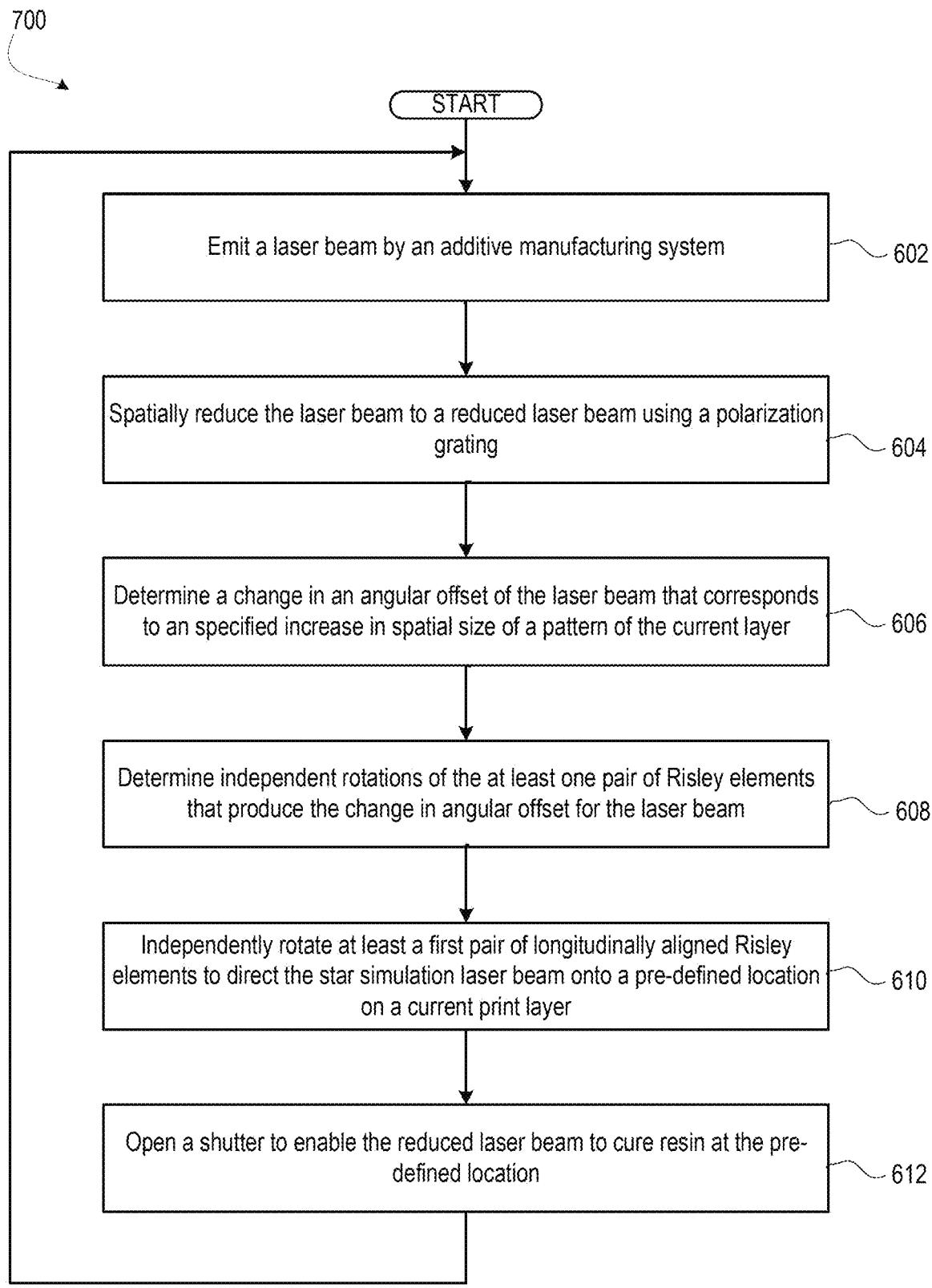
FIG. 6 presents a flow diagram of a method for controlling at least one pair of Risley elements to control a pattern size of a three-dimensional printer resin curing system, according to one or more embodiments.

FIG. 6 presents a flow diagram of a method for controlling at least one pair of Risley elements to control a pattern size of a three-dimensional printer resin curing system. The method 600 includes emitting a laser beam by an additive manufacturing system (block 602). The method 600 includes spatially reducing the laser beam to a reduced laser beam using a polarization grating (e.g., cycloidal diffractive waveplate (CDW)) (block 604). The method 600 includes determining a change in an angular offset of the laser beam that corresponds to an specified increase in spatial size of a pattern of a current layer produced by the additive manufacturing system (block 606). The method 600 includes determining independent rotations of the at least one pair of Risley elements that produce the change in angular offset for the laser beam (block 608). The method 600 includes independently rotating a first pair of longitudinally aligned Risley elements to direct the star simulation laser beam onto a pre-defined location on a current print layer (block 610). The method 600 includes opening a shutter to enable the reduced laser beam to cure resin at the pre-defined location (block 612). Then method 600 returns to block 602.

The following references cited above are hereby incorporated by reference in their entirety:
(1) Chulwoo Oh, Chulwoo Oh, Jihwan Kim, Jihwan Kim, John F. Muth, John F. Muth, Michael J. Escuti, Michael J. Escuti, "A new beam steering concept: Risley gratings", Proc. SPIE 7466, Advanced Wavefront Control: Methods, Devices, and Applications VII, 74660J {11 Aug. 2009); doi: 10.1117/12.828005; https://doi.org/10.1117/12.828005.
(2) Rumpf, R. C., Pazos, J. J., Digaum, J. L., & Kuebler, S. M. (2015). Spatially variant periodic structures in electromagnetics. Philosophical Transactions of the Royal Society A: Mathematical Physical and Engineering Sciences, 373(2049).
(3) Jennefir L. Digaum, Rashi Sharma, Daniel Batista, Javier J. Pazos, Raymond C. Rumpf, Stephen M. Kuebler, "Beam-bending in spatially variant photonic crystals at telecommunications wavelengths", Proc. SPIE 9759, Advanced Fabrication Technologies for Micro/Nano Optics and Photonics IX, 975911 (14 Mar. 2016).
(4) Pazos, j. (2010). Digitally manufactured spatially variant photonic crystals. Phd. University of Texas at El Paso.
(5) Liu, Longju & Hurayth, Abu & Li, Jingjing & Hillier, Andrew & Lu, Meng. (2016). A strain-tunable nanoimprint lithography for linear variable photonic crystal filters. Nanotechnology. 27.295301.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A three-dimensional printer resin curing system consisting of:
    a laser that emits a laser beam;
    a shutter in communication with the laser that selectively allows the laser beam to pass;
    at least one pair of Risley elements in communication with the laser beam and shutter that direct the laser beam onto a current print layer;
    a controller in communication with the at least one pair of Risley elements that independently rotates each Risley element to spatially reduce the laser beam using a polarization grating, and to position the laser beam onto a pre-defined location of a selected spatial size of a current print layer;
    more than one holder that respectively receive each one of the at least one pair of Risley-elements for independent rotation, the holders being in communication with the controller;
    more than one rotation actuator that are respectively engaged to each holder for rotation; and
    a memory in communication with the controller, the memory containing an application and a lookup table, wherein the controller comprises a processor that executes the application to:
        monitor current rotation positions respectively of the at least one pair of Risley elements reported by the respective rotation actuators;
        determine the pre-defined location on the current print layer that corresponds to a selected size of a pattern of the current print layer;
        determine a change in the rotation positions of each Risley element specified in the lookup table based on the current rotation positions and the two-dimensional position of the light beam; and
        actuate each rotation actuator to effect the change in the rotation positions, wherein the at least one pair of Risley element comprises a second pair of Risley elements to further adjust the selected spatial size of the current print layer, wherein the at least one pair of Risley element comprises a second pair of annular Risley elements to further adjust the position of the laser beam onto the selected spatial size of an outer annular portion of the current print layer.

2. The three-dimensional printer resin curing system of claim 1, wherein each Risley element comprises a Risley prism.

3. The three-dimensional printer resin curing system of claim 1, wherein each Risley element comprises a Risley grating.

4. The three-dimensional printer resin curing system of claim 1, wherein each Risley element comprises a photonic crystal.

* * * * *